US007007000B2

(12) United States Patent
Engelhart

(10) Patent No.: US 7,007,000 B2
(45) Date of Patent: Feb. 28, 2006

(54) SECURE ONLINE PURCHASING

(75) Inventor: Bob Engelhart, Redmond, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 339 days.

(21) Appl. No.: 10/080,988

(22) Filed: Feb. 22, 2002

(65) Prior Publication Data

US 2003/0163379 A1 Aug. 28, 2003

(51) Int. Cl.

| | |
|---|---|
| ***G06F 17/60*** | (2006.01) |
| ***H04K 1/00*** | (2006.01) |
| ***H04L 9/00*** | (2006.01) |

(52) U.S. Cl. ............................ 705/75; 705/44; 705/76; 705/77; 705/78

(58) Field of Classification Search .................. 705/44, 705/75, 76, 77, 78; 379/114.1, 114.12
See application file for complete search history.

(56) References Cited

U.S. PATENT DOCUMENTS

| | | | | | |
|---|---|---|---|---|---|
| 4,947,028 | A | * | 8/1990 | Gorog | 235/380 |
| 5,715,314 | A | * | 2/1998 | Payne et al. | 705/78 |
| 5,757,917 | A | * | 5/1998 | Rose et al. | 705/79 |
| 5,794,221 | A | | 8/1998 | Egendorf | 705/40 |
| 5,826,241 | A | * | 10/1998 | Stein et al. | 705/26 |
| 5,907,831 | A | | 5/1999 | Lotvin et al. | 705/14 |
| 5,909,492 | A | * | 6/1999 | Payne et al. | 705/78 |
| 5,920,847 | A | * | 7/1999 | Kolling et al. | 705/40 |
| 6,023,682 | A | * | 2/2000 | Checchio | 705/18 |
| 6,029,150 | A | * | 2/2000 | Kravitz | 705/39 |

(Continued)

FOREIGN PATENT DOCUMENTS

| | | | |
|---|---|---|---|
| EP | 0982674 A2 | * | 3/2000 |
| EP | 1020824 A2 | * | 7/2000 |
| WO | WO-98/19260 A1 | * | 5/1998 |

OTHER PUBLICATIONS

Francella, B.G., "Food–Stamp Handling Made Easy," Convenience Store News, p. 54, Jan. 16, 1995.*

Anon., "New Members Join NACHA's Internet Payment Project," Electronic Payments International, p. 3, Jun. 2001.*

Anon., "The French Try Shopping on the Run," Card Technology, p. 8+, Mar. 2000.*

Taaffe, J., "Lack of Global Standards Spurs Regional Groups . . . But M–Payments Still Need to Be Easier," Communications Week International, No. 267, p. 15, Jun. 18, 2001.*

Anon., printouts from iPIN Web site, 50 pp. [downloaded from the World Wide Web on May 29, 2003.].

Search Report from PCT/US03/04650.

*Primary Examiner*—Nicholas D. Rosen
(74) *Attorney, Agent, or Firm*—Klarquist Sparkman, LLP

(57) ABSTRACT

In a method of purchasing online, a client device of a customer communicates a purchase selection which is received by a vendor computer system. The vendor computer system, in response, communicates a cost of the purchase selection and fund confirmation address to the client device. The client device communicating a payment authorization for the cost that is received by a fund guardian. The fund guardian confirms the availability of sufficient funds to pay the cost. The vendor computer system communicates a fund confirmation address which is received by the fund guardian. When sufficient funds are available to pay the cost, the fund guardian communicates a fund confirmation to the fund confirmation address.

45 Claims, 6 Drawing Sheets

U.S. PATENT DOCUMENTS

| | | | | | |
|---|---|---|---|---|---|
| 6,036,344 | A | * | 3/2000 | Goldenberg | 705/39 |
| 6,067,416 | A | * | 5/2000 | Fraser | 717/178 |
| 6,118,860 | A | * | 9/2000 | Hillson et al. | 379/155 |
| 6,188,994 | B1 | | 2/2001 | Egendorf | 705/40 |
| 6,206,283 | B1 | | 3/2001 | Bansal et al. | 235/379 |
| 6,219,439 | B1 | | 4/2001 | Burger | 382/115 |
| 6,269,348 | B1 | | 7/2001 | Pare, Jr. et al. | 705/39 |
| 6,327,578 | B1 | * | 12/2001 | Linehan | 705/65 |
| 6,493,437 | B1 | * | 12/2002 | Olshansky | 379/114.13 |
| 6,505,171 | B1 | * | 1/2003 | Cohen et al. | 705/26 |
| 6,567,794 | B1 | * | 5/2003 | Cordery et al. | 705/60 |
| 2001/0007983 | A1 | * | 7/2001 | Lee | 705/69 |
| 2001/0037254 | A1 | * | 11/2001 | Glikman | 705/26 |
| 2001/0037264 | A1 | * | 11/2001 | Husemann et al. | 705/26 |
| 2001/0051924 | A1 | | 12/2001 | Uberti | 705/44 |
| 2002/0019811 | A1 | | 2/2002 | Lapsley et al. | 705/44 |
| 2002/0052841 | A1 | * | 5/2002 | Guthrie et al. | 705/40 |
| 2002/0073046 | A1 | * | 6/2002 | David | 705/67 |
| 2002/0077837 | A1 | * | 6/2002 | Krueger et al. | 705/1 |
| 2002/0174062 | A1 | * | 11/2002 | Sines et al. | 705/39 |
| 2002/0178122 | A1 | * | 11/2002 | Maes | 705/64 |
| 2003/0023549 | A1 | * | 1/2003 | Armes et al. | 705/40 |
| 2003/0074317 | A1 | | 4/2003 | Hofi | 705/44 |
| 2003/0120615 | A1 | * | 6/2003 | Kuo | 705/78 |
| 2003/0130959 | A1 | * | 7/2003 | Rosenbaum | 705/75 |

* cited by examiner

SECURE ONLINE PURCHASING

TECHNICAL FIELD

This invention relates to online purchasing. More specifically, the invention relates to purchasing online in a manner that helps ensure the security of a customer's financial data.

BACKGROUND

Customers are increasingly turning to computer networks, and the Internet in particular, to locate and purchase goods and services. So-called 'online' shopping involves the location and purchase of goods and/or services by way of a network. Increasingly, mobile phones and other wireless devices are being employed to this end.

One problem with conventional online shopping techniques is that they typically involve payment by way of credit or debit cards. To consummate such transactions, sensitive customer financial data is communicated between the customer and the vendor and may be stored electronically by the vendor. This subjects the financial information to theft vulnerabilities. For example, the information may be intercepted by unscrupulous third parties when it is communicated from a computer system of the customer to a computer system of the vendor. Thieves may also penetrate the security of the vendor's computer system where the financial information is stored to obtain the financial information of large numbers of customers. In networked computer environments where customers purchase from many vendors, the security risk quickly multiplies as a customer's financial information is communicated and stored among an ever greater number of computer systems.

One prior art approach has attempted to address these shortcomings by centralizing the billing function (whereby the customer is charged and remits payment for goods and/or services purchased) at the customer's Internet Access Provider (ISP). This approach is taught by U.S. Pat. No. 5,794,221 and U.S. Pat. No. 6,188,994 B1, both to Egendorf. A drawback of this approach is that it does not reflect the natural manner in which most customers are accustomed to shopping, and it places the ISP in the awkward role of charging for and disbursing funds for a wide variety of goods and/or services that have nothing to do with the ISP's core function of providing Internet access.

SUMMARY

In one aspect, a client device of a customer communicates a purchase selection that is received by a vendor computer system. The vendor computer system, in response, communicates a cost of the purchase selection that is received by the client device. The client device communicates a payment authorization for the cost that is received by a fund guardian. The fund guardian confirms the availability of sufficient funds to pay the cost. The vendor computer system communicates a fund confirmation address that is received by the fund guardian. When sufficient funds are available to pay the cost, the fund guardian communicates a fund confirmation to the fund confirmation address.

In another aspect, a client device of a customer communicates a purchase selection that is received by a vendor computer system. The vendor computer system in response communicates a cost of the purchase selection that is received by the client device. The client device communicates a payment authorization for the cost of the purchase selection that is received by a fund guardian. The fund guardian confirms the availability of sufficient funds to pay the cost. The payment authorization is also received by a billing system that suspends network access charges for the customer in response to receiving the payment authorization. The vendor computer system also communicates a fund confirmation address that is received by the fund guardian. When sufficient funds are available to pay the cost, the fund guardian communicates a fund confirmation to the fund confirmation address.

DRAWINGS

DESCRIPTION

In the following figures and description, like numbers refer to like elements. References to "one embodiment" or "an embodiment" do not necessarily refer to the same embodiment, although they may.

Figure 1:
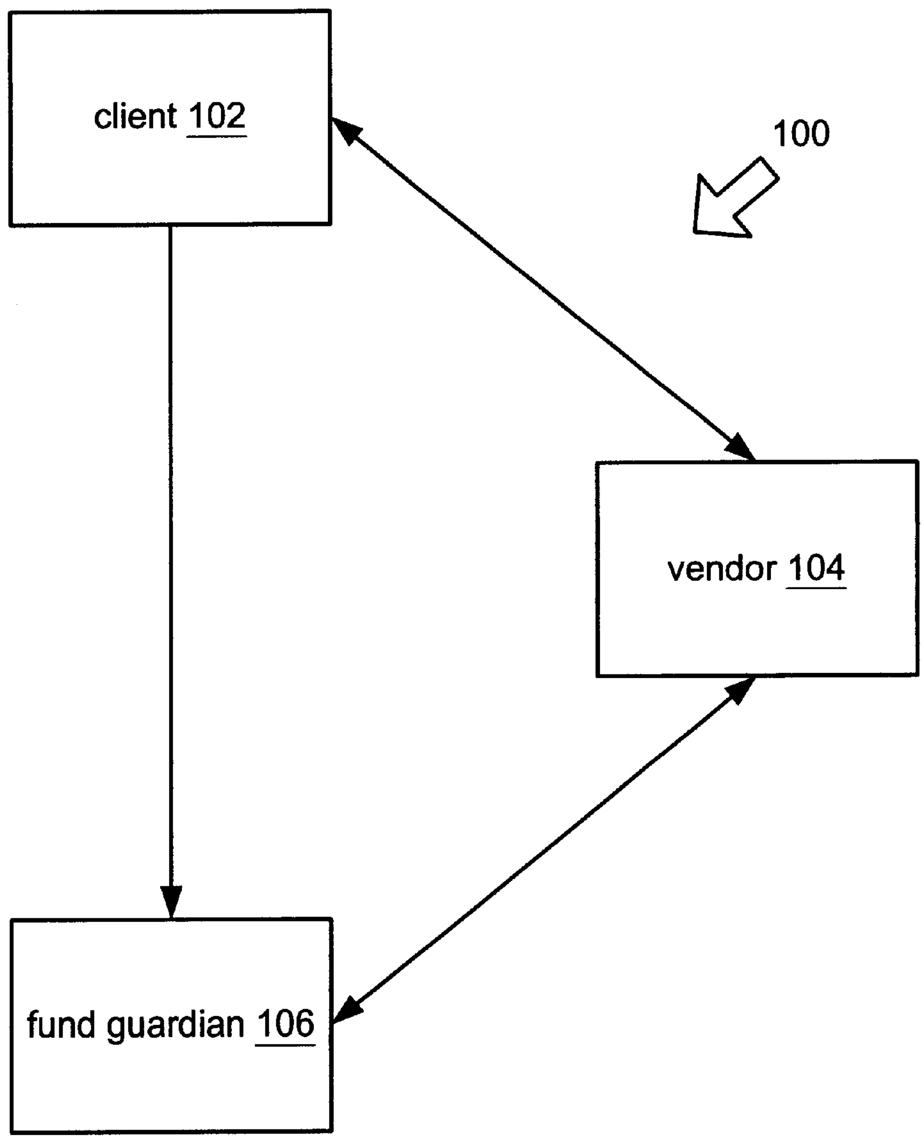
FIG. 1 is a block diagram of an embodiment of a system for online shopping.

With reference to FIG. 1, an embodiment 100 of a system for online purchasing includes a client device 102 operated by a customer to make a purchase online. The client device 102 may be a computer system such as a personal computer, a handheld computer, a mobile telephone, and so on. Herein, a computer or computer system is any device or collection of devices comprising at least one processor and memory, the memory to store instructions and data for execution and/or manipulation by the processor. Exemplary computers and computer systems are personal computers, server computers, handheld and palm-type computers, mobile phones with data processing capabilities, data centers, and web sites.

The client 102 communicates with a vendor computer system 104 via a network. In other words, the client 102 communicates "online". The network may comprise copper or optical conductors, and/or wireless channels. The network may comprise other computer systems and switching and routing systems to route data signals between computer systems. The Internet, working in conjunction with private wireless access providers, is one example of a network. Details of the network are omitted so as not to obscure the description of the present invention.

The vendor 104 provides the client 102 with product selections for purchase and, in the case of content, software, and other information-based products, for download to the client 102.

Both the client 102 and the vendor 104 communicate with a fund guardian 106. The fund guardian 106 is any computer system that maintains access to the customer's funds—for example, a credit or debit card system, an escrow system, a banking system, a system comprising electronic wallet software, and so on. During a purchase transaction, the client 102, vendor 104, and fund guardian 106 communicate to confirm payment for the products or services purchased. The communication is performed in a manner that does not involve the exchange of sensitive client financial information, such as credit and debit card numbers.

Figure 2:
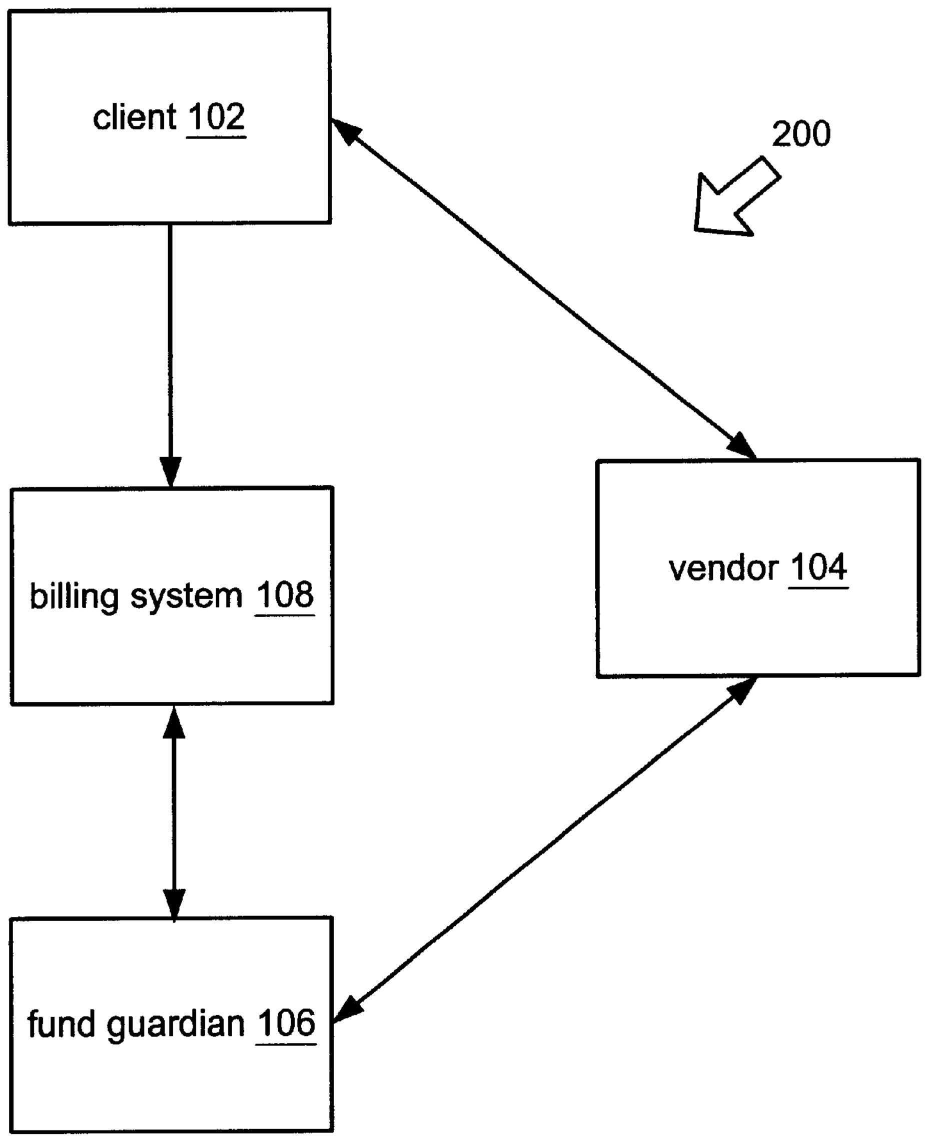
FIG. 2 is a block diagram of another embodiment of a system for online shopping.

With reference to FIG. 2, another embodiment 200 of a system for online purchasing involves a billing computer system 108. The billing system 108 may operate to suspend network access charges during a period of time while the client 102 is downloading content-based products, such as movies, music, and software. For example, in prepaid wireless access plans, the billing system 108 may suspend the billing of the customer's wireless access account during a time while a download is in progress.

Figure 3:
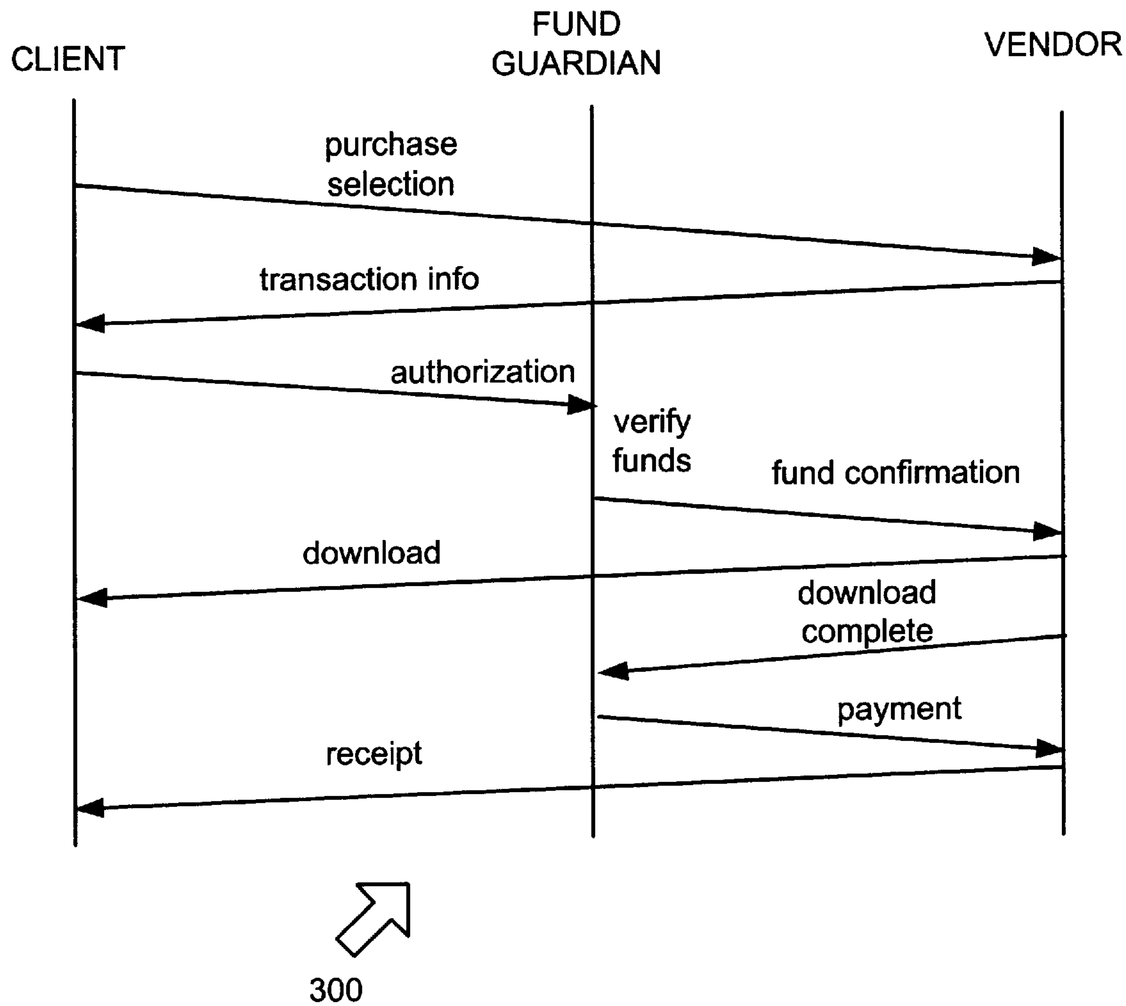
FIG. 3 is a message exchange diagram illustrating an embodiment of a process of shopping online.

With reference to FIG. 3, an embodiment 300 of a method to purchase online begins with a purchase selection by the client device. The purchase selection is communicated to the vendor computer system, which generates and communicates transaction information in response. (One embodiment of transaction information is described in conjunction with FIG. 5.) The client communicates a payment authorization to the fund guardian and the fund guardian verifies that sufficient customer funds are available to satisfy the transaction. Details of an embodiment of a payment authorization are provided in conjunction with FIG. 6. The fund guardian communicates a fund confirmation to the vendor, indicating that sufficient funds are available to complete the transaction. Details of an embodiment of a fund confirmation are provided in conjunction with FIG. 7.

If the product selection identifies a content-based product, a download of the product may then proceed from the vendor. Upon completion of the download, a receipt may be communicated from the vendor to the client. The vendor may also notify the fund guardian that the download is complete, so that the fund guardian can debit the customer's account and arrange for the transfer of payment to the vendor.

If for some reason the download does not complete, perhaps due to a broken network connection or equipment failure, then the vendor may not provide a receipt nor notify the fund guardian that the download is complete, and the customer's account is not charged.

If the product is not content-based, arrangements may be made to ship the product to the customer via mail or commercial carrier. In this case, the vendor may simply communicate to the fund guardian that the customer's account should be charged for the purchase.

Figure 4:
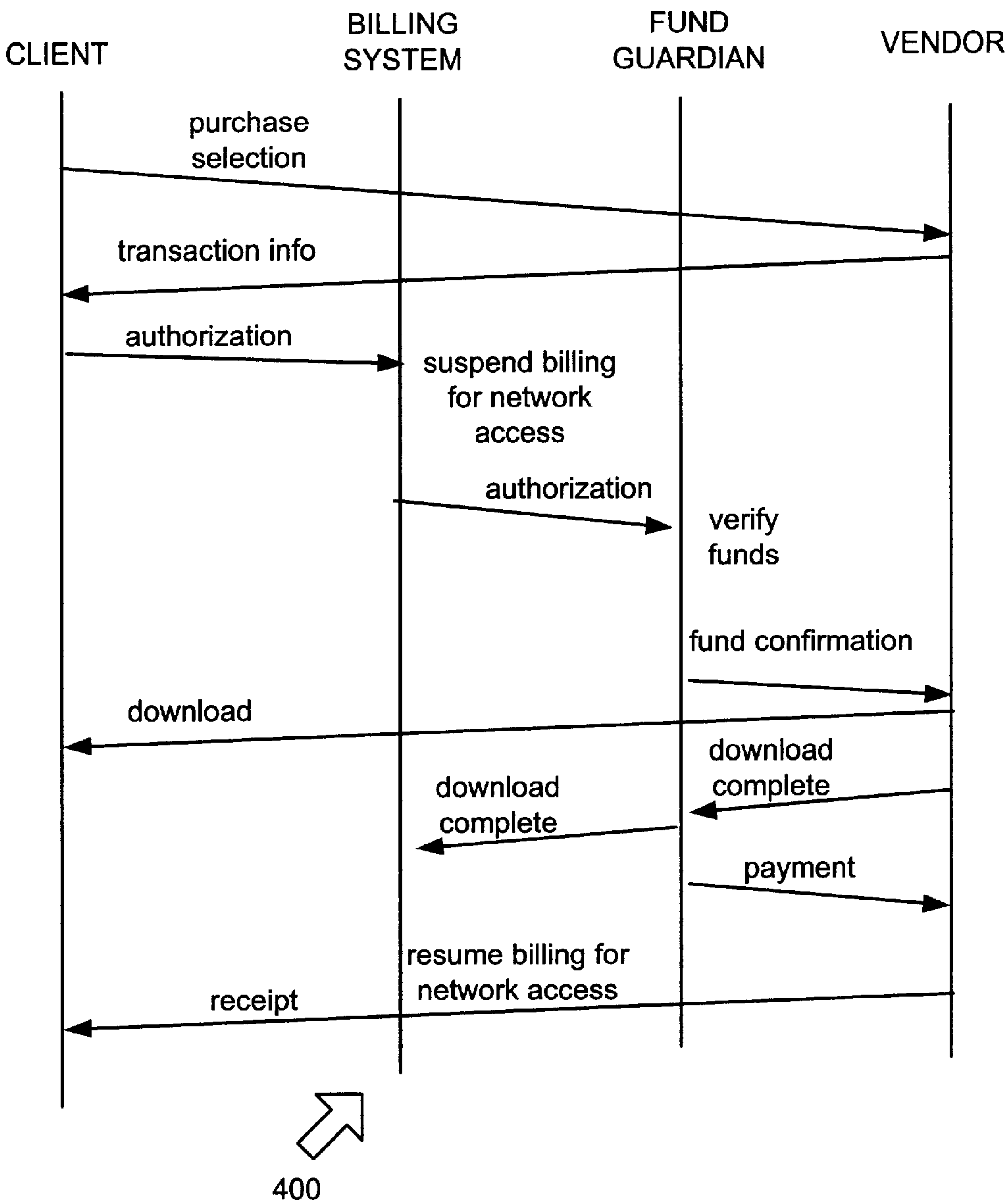
FIG. 4 is a message exchange diagram illustrating another embodiment of a process of shopping online.

With reference to FIG. 4, an embodiment 400 of a method to purchase online begins with a purchase selection by the client device. The method 400 may be particularly useful in situations where network access charges are applied according to the time or volume of data that the customer consumes online. The purchase selection is communicated to the vendor computer system, which generates and communicates transaction information in response. The client communicates a payment authorization to the billing system, which suspends billing for network access and communicates the payment authorization to the fund guardian. The fund guardian verifies that sufficient customer funds are available to satisfy the transaction. The fund guardian communicates a fund confirmation to the vendor, indicating that sufficient funds are available to complete the transaction.

If the product selection identified a content-based product, a download of the product may then proceed from the vendor. Upon completion of the download, a receipt may be communicated from the vendor to the client. The vendor may also notify the fund guardian that the download is complete, so that the fund guardian can debit the customer's account and arrange for the transfer of payment to the vendor. The fund guardian may communicate to the billing system an indication that the download completed, and the billing system may in response resume charging the customer's account for network access time.

The method 400 may prove especially useful in prepaid wireless access accounts, where the customer has prepaid for a certain amount of wireless network access time or data traffic. Suspending network access charges during a download may avoid the unfortunate situation where the customer's network access connection is terminated during a download due to exhaustion of the customer's prepaid account.

Those skilled in the art will appreciate that various computer systems and devices may intervene in the communications between the client device, vendor computer system, fund guardian, and billing system in the various embodiments. For example, the fund confirmation address may be communicated by the vendor computer system and received by the fund guardian, but in the process the fund confirmation address may be received and communicated by any number of other computer systems, switches, routers, and so forth. Alternate embodiments may employ various intermediaries in the communications between the client device, vendor computer system, billing system, and fund guardian.

Figure 5:
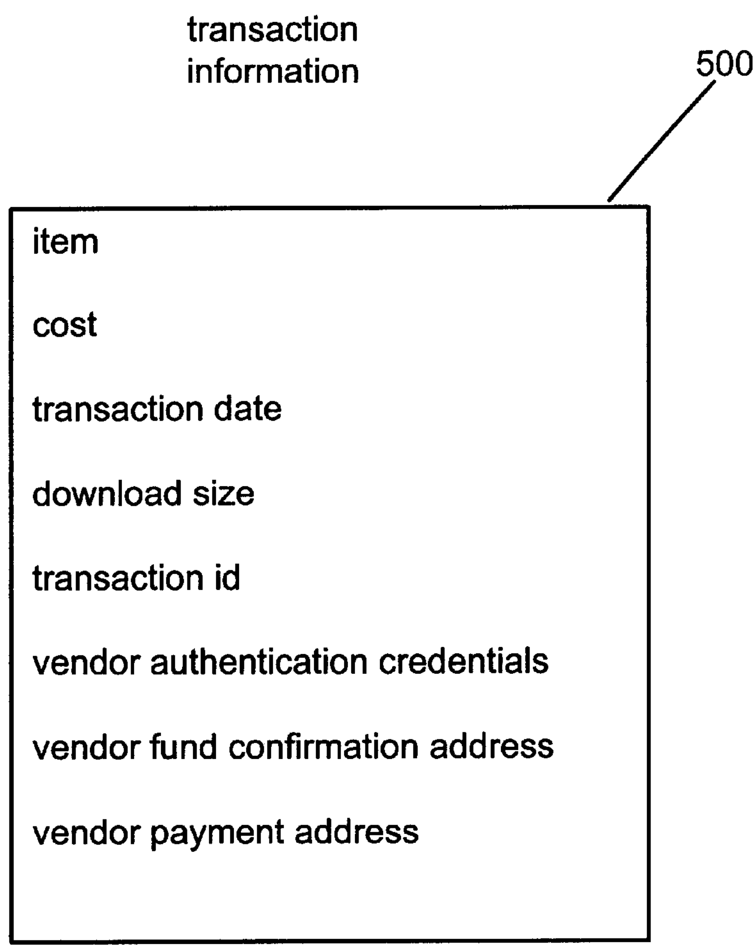
FIG. 5 is a block diagram illustrating an embodiment of transaction information.

With reference to FIG. 5, an embodiment 500 of transaction information includes an identification and/or description of the item or items purchased (products or services) and the cost. A transaction date may also be included. Where the item involves a download, the size of the download may be included.

A transaction id identifies the transaction. Of course, the transaction could be identified by way of a combination of the transaction information, such as by forming a unique combination of the transaction time and date, items purchased, and customer information. In general, it is sufficient that the transaction information comprises enough information to uniquely identify the transaction.

The transaction information may include vendor authentication credentials that help establish the vendor's identity. Digital signatures and certificates are examples of vendor authentication credentials. Including vendor authentication credentials in the transaction information may help the customer establish trust that the transaction information is from the vendor and that the transaction information has not been altered from the form in which it was generated.

A vendor confirmation address is included in the transaction information. The vendor confirmation address comprises a network address to which the funds confirmation may be communicated from the funds guardian to the vendor. For example, on Internet Protocol (IP) networks, the vendor address may comprise an IP address and a port number. A vendor payment address may also be included, or it may be the same as the vendor confirmation address. The vendor payment address is a network address with which the funds guardian may communicate in order to effect a funds transfer that constitutes payment to the vendor for the item purchased by the customer.

Figure 6:
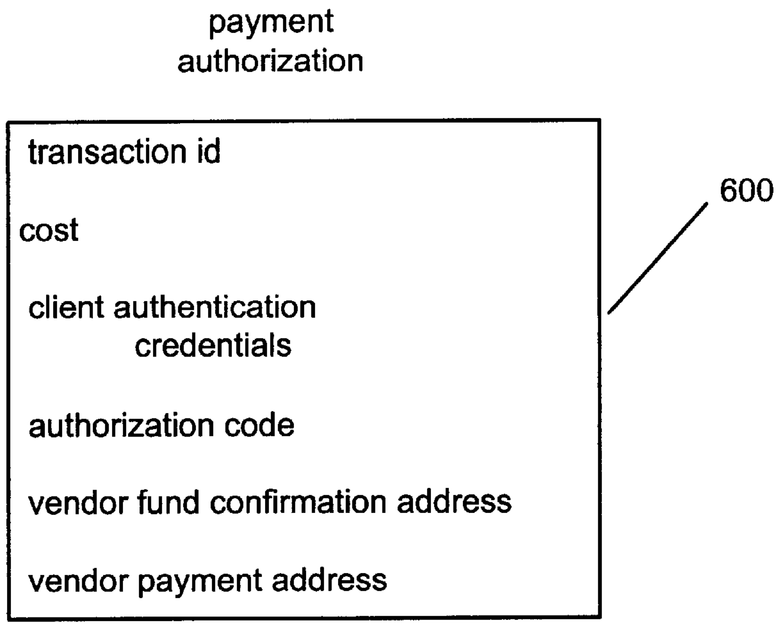
FIG. 6 is a block diagram illustrating an embodiment of a payment authorization.

With reference to FIG. 6, an embodiment 600 of a payment authorization includes the transaction id and cost comprised by the transaction information. The transaction id may be used to associate the payment authorization with the transaction. The payment authorization may also comprise customer authorization credentials to establish trust that the payment authorization is from the customer and has not been altered during communication from the client to the funds guardian or billing system. A digital signature may also help establish non-repudiation of the origin of the payment authorization.

An authorization code may be included to uniquely identify the payment authorization from other such authorizations. The authorization code may be used to associate the payment authorization with the later communication of the funds confirmation to the vendor.

The payment authorization further comprises the vendor fund confirmation address. Upon receiving the payment authorization and verifying that sufficient funds are available, the fund guardian may communicate the fund confirmation to the vendor fund confirmation address. The vendor payment address may also be included in the payment authorization.

Figure 7:
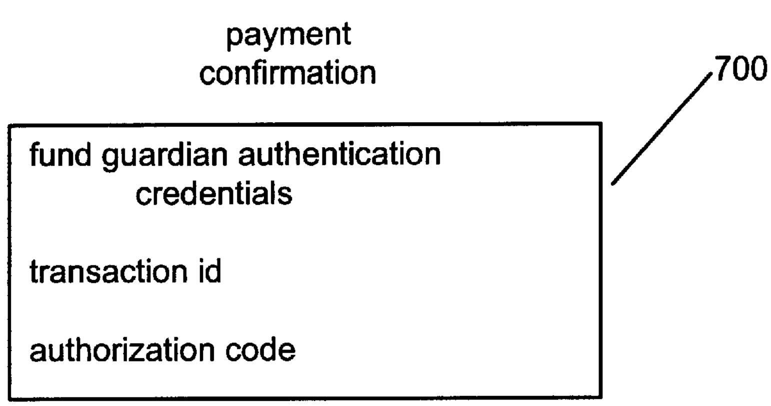
FIG. 7 is a block diagram illustrating an embodiment of a fund confirmation.

With reference to FIG. 7, an embodiment 700 of a fund confirmation includes the transaction id to associate the fund confirmation with the transaction, and may also include the authorization code to associate the fund confirmation with the payment authorization. The fund confirmation further comprises fund guardian authentication credentials, which help establish trust that the fund guardian is the origin of the fund confirmation.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A method of purchasing online, comprising:

a client device of a customer communicating a purchase selection, the purchase selection received by a vendor computer system, the vendor computer system in response communicating a cost of the purchase selection and a fund confirmation address, the cost and fund confirmation address received by the client device;

the client device communicating a payment authorization for the cost, the payment authorization received by a fund guardian, the fund guardian to confirm the availability of sufficient funds to pay the cost, the payment authorization also received by a billing system, the billing system suspending network access charges for the customer in response to receiving the payment authorization;

the client device communicating the fund confirmation address, the fund confirmation address received by the fund guardian; and when sufficient funds are available to pay the cost, the fund guardian communicating a fund confirmation to the fund confirmation address without using the client device as an intermediary.

2. The method of claim 1 further comprising:

the vendor computer system enabling a download to the client device in response to the fund confirmation.

3. The method of claim 2 further comprising:

the vendor computer system communicating to the fund guardian that the download completed successfully; and the fund guardian causing funds to transfer to the vendor computer system in response to the download completing successfully.

4. The method of claim 1 wherein the fund guardian is a banking system.

5. The method of claim 1 wherein the fund guardian is an escrow system.

6. The method of claim 1 wherein the vendor computer system further communicates a transaction ID, the transaction ID received by the client device, and wherein the method further comprises the client device communicating the transaction ID, the transaction ID received by the fund guardian.

7. The method of claim 1 wherein the vendor computer system further communicates transaction time information, the transaction time information received by the client device, and wherein the method further comprises the client device communicating the transaction time information, the transaction time information received by the fund guardian.

8. A method of purchasing online, comprising:

a client device of a customer communicating a purchase selection, the purchase selection received by a vendor computer system, the vendor computer system in response communicating a cost of the purchase selection and a fund confirmation address, the cost and fund confirmation address received by the client device;

the client device communicating a payment authorization for the cost of the purchase selection, the payment authorization received by a fund guardian, the fund guardian to confirm the availability of sufficient funds to pay the cost, the payment authorization also received by a billing system, the billing system suspending network access charges for the customer in response to receiving the payment authorization;

the client device communicating the fund confirmation address, the fund confirmation address received by the fund guardian; and when sufficient funds are available to pay the cost, the fund guardian communicating a fund confirmation to the fund confirmation address.

9. The method of claim 8 further comprising:

the vendor computer system enabling a download to the client device in response to receiving the fund confirmation; and the vendor computer system communicating an indication that the download completed successfully, the billing system receiving the indication that the download completed successfully and in response resuming network access charges for the customer.

10. The method of claim 8 wherein the network access charges are against a prepaid wireless access account.

11. The method of claim 8 wherein the network access charges are in terms of network access time.

12. The method of claim 8 wherein the network access charges are in terms of data volume.

13. The method of claim 8 wherein the fund guardian is a banking system.

14. The method of claim 8 wherein the fund guardian is an escrow system.

15. A method of transacting online, comprising:

communicating a purchase selection to a vendor computer system;

receiving from the vendor computer system a cost of the purchase selection and a fund confirmation address;

communicating the fund confirmation address and a payment authorization for the cost of the purchase selection to a fund guardian; communicating the payment authorization for the cost of the purchase selection to a billing system; and with the billing system, suspending network access charges in response to receiving the payment authorization.

16. The method of claim 15 further comprising:

receiving content which is the subject of the purchase selection from the vendor computer system as a result of the fund guardian providing a fund confirmation for the cost to the fund confirmation address.

17. A method of transacting online, comprising:

communicating a purchase selection to a vendor computer system;

receiving from the vendor computer system a cost of the purchase selection and a fund confirmation address;

communicating a payment authorization for the cost of the purchase selection to a billing system, and with the billing system, suspending network access charges in response to receiving the payment authorization.

18. The method of claim 17 further comprising:

communicating the fund confirmation address to a fund guardian; and receiving content which is the subject of the purchase selection from the vendor computer system as a result of the fund guardian providing a fund confirmation for the cost to the fund confirmation address.

19. The method of claim 17 wherein a client device communicates to the vendor computer system and to the billing system.

20. The method of claim 19 wherein the client device is a handheld computer.

21. The device of claim 19 wherein the client device is a mobile telephone.

22. The method of claim 17 wherein the network access charges are against a prepaid wireless access account.

23. The method of claim 17 wherein the network access charges are in terms of network access time.

24. The method of claim 17 wherein the network access charges are in terms of data volume.

25. A method of transacting online, comprising:

receiving a purchase selection, the purchase selection communicated by a client device;

in response to receiving the purchase selection, communicating to the client device a cost of the purchase selection and a fund confirmation address for subsequent communication by the client device to a fund guardian for a user of the client device;

receiving by a billing system an indication of the purchase selection, the indication of the purchase selection communicated by a client device; with the billing system, suspending network access charges in response to receiving the indication of the purchase selection;

receiving at the fund confirmation address a fund confirmation for the cost of the purchase selection; and enabling a download by the client device in response to receiving the fund confirmation.

26. A The method of claim 25 wherein the fund confirmation is received from the fund guardian.

27. The method of claim 26 further comprising:

communicating to the fund guardian an indication that the download completed successfully.

28. The method of claim 25 wherein the fund guardian is a banking system.

29. The method of claim 25 wherein the fund guardian is an escrow system.

30. A method of transacting online, comprising:

communicating a purchase selection for receipt by a vendor computer system;

receiving a cost of the purchase selection, the cost communicated by the vendor computer system;

communicating an indication of the purchase selection for receipt by a billing system; and with the billing system, suspending network access charges in response to receiving the indication of the purchase selection.

31. The method of claim 30 wherein a client device communicates to the vendor computer system and to the billing system.

32. The method of claim 1 wherein the client device is a handheld computer.

33. The method of claim 1 wherein the client device is a mobile telephone.

34. The method of claim 30 wherein the network access charges are against a prepaid wireless access account.

35. The method of claim 30 wherein the network access charges are in terms of network access time.

36. The method of claim 30 wherein the network access charges are in terms of data volume.

37. The method of claim 30 further comprising:

receiving a transaction ID communicated by the vendor computer system; and communicating the transaction ID for receipt by the billing system.

38. The method of claim 30 further comprising:

receiving transaction time information communicated by the vendor computer system; and communicating the transaction time information for receipt by the billing system.

39. A method of transacting online, comprising:

communicating a purchase selection for receipt by a vendor computer system;

receiving a cost of the purchase selection and a fund confirmation address, the cost and the fund confirmation address communicated by the vendor computer system;

for receipt by a fund guardian, communicating the fund confirmation address and a payment authorization for the cost of the purchase selection communicating the payment authorization for the cost of the purchase selection to a billing system; and with the billing system, suspending network access charges in response to receiving the payment authorization.

40. The method of claim 39 further comprising:

receiving content which is the subject of the purchase selection, the content communicated by the vendor computer system as a result of the fund guardian providing a fund confirmation for the cost to the fund confirmation address.

41. The method of claim 39 wherein a client device communicates to the vendor computer system, to the fund guardian and to the billing system.

42. The method of claim 41 wherein the client device is a handheld computer.

43. The method of claim 41 wherein the client device is a mobile telephone.

44. The method of claim 39 further comprising:

receiving a transaction ID communicated by the vendor computer system; and communicating the transaction ID for receipt by the fund guardian.

45. The method of claim 39 further comprising:

receiving transaction time information communicated by the vendor computer system; and communicating the transaction time information for receipt by the fund guardian.

* * * * *